United States Patent [19]

Knowles

[11] Patent Number: 4,803,107

[45] Date of Patent: Feb. 7, 1989

[54] LIGHT WEIGHT THERMAL INSULATION MATERIAL PRODUCT AND PROCESS

[76] Inventor: Jack V. Knowles, 420 S. Francis, Lansing, Mich. 48912

[21] Appl. No.: 189,400

[22] Filed: May 2, 1988

[51] Int. Cl.$^4$ .................... C04B 7/02; B32B 13/00; B32B 5/16

[52] U.S. Cl. ........................ 428/68; 106/89; 106/97; 106/98; 106/99; 428/70; 428/74; 428/283; 428/703

[58] Field of Search ............... 106/89, 97, 98, 99; 428/68, 70, 74, 283, 363, 703

[56] References Cited

U.S. PATENT DOCUMENTS

| | | | |
|---|---|---|---|
| 2,858,227 | 10/1958 | Rodsky | 106/97 |
| 3,847,633 | 11/1974 | Race | 106/99 |
| 4,504,533 | 3/1985 | Altenhöfer et al. | 428/703 |
| 4,544,409 | 10/1985 | Daussan et al. | 106/99 |
| 4,572,861 | 2/1986 | Garcia et al. | 428/703 |

*Primary Examiner*—William J. Van Balen
*Attorney, Agent, or Firm*—Warren H. Kintzinger

[57] ABSTRACT

A construction material light weight as compared to standard concrete yet having excellent thermal insulation qualities. The material when processed uses cement, pumice in small size particularized form and/or volcanic ash, scoria in particularized form, vermiculite in flaked particle form and water for the cement. While excellent product may be formed with these ingredients alone a more uniformly predicable product may be produced if, prior to mixing of all the ingredients, the vermiculite is mixed with kerosene on the ratio of approximately one cubic foot to one fourth cubic foot. The vermiculite is then mixed with the pumice to kerosene coat the pumice to block absorbtion of water from the water cement mixture by the pumice to thereby insure proper curing of the cement binder in the overall material mix. Fluffed mineral wool may be added to the mixture generally to the extent of some seven to eleven percent of the overall mix with as a preliminary step the fluffed stringy mineral wool being process mixed with the scoria with enough mixing time to wrap the mineral wool around the scoria such as to minimize water washing of the cement binder into cavities of the scoria. If the thermal "R" factor is the main consideration the mineral wool (fluffed) volumetric content may be increased to as much as fifty percent for a greater "R" factor.

20 Claims, No Drawings

LIGHT WEIGHT THERMAL INSULATION MATERIAL PRODUCT AND PROCESS

This invention relates in general to concrete, and more particularly, to a light weight concrete having substantially different performance characteristics than ordinary concrete in that it has high thermal insulation properties and when exposed to high intense heat it does not spall, pop or crack.

There is a great need for building materials that have good thermal insulation qualities that when used in building walls and ceilings present excellent fire barriers. In order to do this successfully such materials must have thermal expansion characteristics such that they do not separate from structural beams, plumbing, cableing and other structural members they are poured around when exposed to intense heat encountered with a fire. It is important that such fire heat barriers have a long duration burn through time while also presenting good structural load factors both in compression and tension along with some resilient adaption to various stress and strains encountered in use through an extremely long service life. Cost factors are also extremely important in the building trades with such advantageous thermal and structural characteristics being presented in a product economically competitive with other products used in construction.

It is therefore a principal object of this invention to provide a light weight insulation material using cement as a binder having excellent insulation qualities.

Another object is through use of such an insulation material to provide excellent fire barriers in walls and ceilings that save lives, minimizes injury and property damage and protects building structures from heat damage.

A further object is to provide such an improved building material that results in construction cost savings.

Still another object is to provide such a light weight insulation building material presenting good structural load factors both in compression and tension along with resilient adaption to various stress and strains imposed thereon throughout an extensive service life.

Features of the invention useful in accomplishing the above include, in a light weight thermal insulation material product line and the production processes therefore, that in its simplest form when processed uses cement, pumice in small particularized form and/or volcanic ash, scoria in particularized form, vermiculite in flaked particle form and water for the cement. A more uniformly predictable product is produced if, prior to mixing all the ingredients, the vermiculite is mixed with kerosene on the ratio of approximately four to one to block absorbtion of water, from the cement mixture, by the pumice to insure proper curing of the cement. This is with the kerosene soaked vermiculite being mixed with pumice for uniform kerosene coating of the pumice prior to addition of cement and water to the mixture to block transfer of water from the cement and water mix to the pumice. As a further product refinement for improved thermal "R" factors and again for an improved and predictable product fluffed mineral wool is added to the mixture ranging up to as much as fifty percent of the mixture volumetric content although it is usually used in the seven to eleven percent range (of the overall mix). Any of the various light weight concrete embodiments in molded or cast form can be used with a layer of mineral wool batting sandwiched between a wall of other material and a layer of the concrete or between two layers of the light weight concrete for improved thermal "R" factors through such a wall or ceiling.

Specific embodiments representing what are presently regraded as the best modes of carrying out the invention are described in greater detail hereinafter along with detailed description of the production processes for producing the respective product embodiments.

In a basic composition form embodiment a dry mix by volume including pumice itself in a small particleized form or a mixture of pumice and volcanic ash in the approximate range of seven to twenty percent of the dry mix, scoria in particleized form in the approximate range of thirty to fifty percent of the dry mix, vermiculite in flaked particle form in the approximate range of seven to twenty percent of the dry mix, and cement in the approximate range of fifteen to forty percent of the dry mix and then water is added to the dry mix in the approximate range of one half to one and one half the volume of the dry cement in the mix. This produces an excellent light weight thermal insulation construction material product. However, a more uniformly predicable product is produced if, prior to mixing of the ingredients, the vermiculite is mixed with kerosene on the ratio of approximately one cubic foot to one fourth cubic (4 to 1 on a volumetric basis) more broadly in the range of 3 to 5 to 1. The vermiculite with kerosene is then mixed with pumice to kerosene coat the pumice to block water absorbtion from the water cement to thereby insure maintenance of a correct water to cement ratio for proper curing of the cement binder in the overall material mix.

Fluffed mineral wool may be included in the product mix as a further product refinement yielding improved thermal "R" factors for the product when used in walls and ceilings with the product forming an excellent fire barrier in either molded or cast formed. While fluffed mineral wool may be added to the mixture generally to the extent of from seven to eleven percent of the overall mix, it may be added to the extent ranging up to as much as fifty percent of the mixture volumetric content for improved thermal "R" factors. As a preliminary step the mineral wool in fluffed stringy form is process mixed with enough mixing time to wrap the mineral wool around the scoria particles with enough mixing time to so wrap the scoria such as to minimize water washing of the cement binder into cavities of the scoria when added to the overall mix.

It should be noted that any of the various light weight concrete embodiments described hereinbefore in molded or cast form can be used with a layer of mineral wool batting sandwiched between a wall of other material and a layer of the concrete or between two layers of the light weight concrete for further improved thermal "R" factors through such a wall or ceiling. The various light weight concrete embodiments could be used in poured or precast roof decks as as a troweled-on or sprayed-on fireproofing for steel structures. They should be quite useful in many other industrial and building uses, as protective thermal barriers for safe rooms and document containers, safes and equipment needing thermal barrier protection. Other applications include furnace insulation and flue thermal barrier installation and even NASA space shuttle thermal barrier protection. In one test conducted with fire department officials present at a fire training center the light weight concrete was used as a ceiling approximately four inches thick covering a room eleven feet by eleven feet with electrical wiring in conduit embedded in the concrete. With a temperature range reached of approximately 1800 to 1900 degrees F with buring gasoline as the heat source the ceiling and wiring showed no evidence of deterioration from the fire test. There was no concrete spalling from the heat and application of a high pressure water stream across the under surface of the heated concrete ceiling did not cause any discernable damage. Furthermore while the test was conducted the inventor was walking on the top of the ceiling in his bare feet. It is of interest that two metal pipes extending through the ceiling were cool to the touch above the ceiling while experiencing some degree of melting below the ceiling.

In the process of producing a specific embodiment of the new light weight thermal insulation concrete that weighs approximately one third the weight of conventional standard concrete process steps include:

1. Addition of two cubic foot of scoria sized from ½ inches down to pan dust size.

2. Stringy mineral wool in fluffed form to the extent of ¼ cubic foot is run mixed with the scoria for approximately ½ minute sufficient to allow time for the mineral wool to wrap around the scoria. This is an aid in helping to prevent water from washing the cement binder into the scoria cavities. Such washing of cement into scoria cavities would make the scoria much heavier and lose some of its insulation value and in addition in effect rob the overall mix of some of its cement binder.

3. One cubic foot of mine run pumice and/or volcanic ash is added as a filler and insulator that can stand high heat. While it is usually approximately balanced between the two materials it can from mine to mine run as high as 100% pumice or 100% volcanic ash with the run mixed ½ minutes for mixing with the scoria and mineral wool.

4. One cubic foot of vermiculite that has been soaked with ¼ cubic foot of kerosene is then added as a filler and as a good insulator and run for ½ minute in the mixture. While 4 and ¼ cubic feet of material have been individually put in the actual mixed volume would be actually closer to approximately 4 cubic feet with the spaces interstices in the fluffed mineral wool and to a lesser degree spaces in the vermiculite.

5. Current binder (Portland cement) is then slowly sprinkled in while mixing up to a 1 to 3 ratio basis for a strong material—less where strength is not a factor and more if compression strength is a significant factor. If very high heat or fire barriers are required Portland Calsium Luminate Cement should be used as the cement binder in the mixture. One bag of cement, by standard one cubic foot, results in a fairly strong product with the cement sprinkled in through approximately a one half minute.

6. While the mixing action is thereafter continued water is slowly added (preferably by light spray) so as not to wash the cement off and out of the mixture with the volume of water added generally running equal to the volume of cement used. The actual amount of water to be used is dependent on water content of pumice and volcanic ash along with the scoria and also on how high a sump is desired. Use dictates this to some extent in that the mixture is to be poured into molds for a smooth finish on the underside with, possibly, lettering to be read more water would be used yielding a lower sump. If the material is to be spray applied to structural elements even more water would be added to the mixture.

The final mixing should be for only a short time with pouring thereafter as soon as possible keeping in mind that the pumice and volcanic ash in the mixture tends to continue the absorbtion of water with the mix needing additional water to be added if there is a loss in time in or before pouring.

Whereas this invention has been described with respect to several embodiments thereof, it should be realized that various changes may be made without departure from the essential contributions to the art made by the teachings hereof.

I claim:

1. A thermal insulation material comprising: a product produced from a dry mix of pumice in small particleized form by volumn in the approximate range of 7% to 20% of the dry mix; scoria in particleized form in the approximate range of 30% to 50% of the dry mix; vermiculite in flaked particle form in the approximate range of 7% to 20% of the dry mix; and cement in the approximate range of 15% to 40% of the dry mix; and water is then added to the dry mix in the approximate range of 0.50 to 1.050 the volume of the dry cement to produce the product, a light weight thermal insulation construction material product.

2. The thermal insulation material of claim 1, wherein a more uniformly predictable product is produced with, prior to mixing of the ingredients of the dry mix, mixing of the vermiculite with kerosene on a ratio in the 3 to 5 range to 1 on a volumetric basis the vermiculite with kerosene then being mixed with the pumice to kerosene coat the pumice and thereafter block water absorbtion from the water cement mixture to insure maintenance of a correct water to cement ratio for proper curing of the cement binder in the overall material mix.

3. The thermal insulation material of claim 2, wherein fluffed mineral wool is added to the dry mix in the range of approximately 7% to 11% of the overall mix.

4. The thermal insulation material of claim 3, wherein as a preparatory step mineral wool in fluffed stringy form is process mixed with said scoria particles with enough mixing time to wrap mineral wool around scoria particles to minimize water washing of the cement binder into cavities of the scoria when added to the overall mix.

5. The thermal insulation material of claim 1, wherein fluffed mineral wool is added to the dry mix in the range of approximately 7 to 11% of the overall mix.

6. The thermal insulation material of claim 5, wherein as a preparatory step mineral wool in fluffed stringy form is process mixed with said scoria particles with enough mixing time to wrap mineral wool around scoria particles enough to minimize water washing of the cement binder into cavities of the scoria when added to the overall mix.

7. The thermal insulation material of claim 2, wherein fluffed mineral wool is added to the dry mix in the range of approximately 11% to 50% of the overall mix for improved thermal "R" factors.

8. The thermal insulation material of claim 7, wherein as a preparatory step mineral wool in fluffed stringy form is process mixed with said scoria particles with enough mixing time to wrap mineral wool around scoria particles enough to minimize water washing of the cement binder into the cavities of the scoria when added to the overall mix.

9. The thermal insulation material of claim 1, wherein fluffed mineral wool is added to the dry mix in the range of approximately 11% to 50% of the overall mix for improved thermal "R" factors.

10. The thermal insulation material of claim 9, whereas as a preparatory step mineral wool in fluffed stringy form is process mixed with said scoria particles with enough mixing time to wrap mineral wool around scoria particles enough to minimize water washing of the cement binder into cavities of the scoria when added to the overall mix.

11. The thermal insulation material of claim 3, wherein at least one of two parallel spaced walls is made of said thermal insulation material and a layer of mineral wool batting is sandwiched in-between said two parallel spaced walls.

12. The thermal insulation material of claim 7, wherein at least one of two parallel spaced walls is made of said thermal insulation material and a layer of mineral wool batting is sandwiched in-between said two parallel spaced walls.

13. The thermal insulation material of claim 1, wherein at least one of two parallel walls is made of said thermal insulation material and a layer of mineral wool batting is sandwiched in-between said two parallel spaced walls.

14. The thermal insulation material of claim 1, wherein said product is in molded form.

15. The thermal insulation material of claim 1, wherein said product is in cost form.

16. The thermal insulation material of claim 1, wherein said product is a troweled-on product.

17. The thermal insulation material of claim 1, wherein said product is a sprayed-on product.

18. The thermal insulation material of claim 3, wherein said product is in molded form.

19. The thermal insulation material of claim 3, wherein said product is in cost form.

20. The thermal insulation material of claim 3, wherein said product is a troweled-on product.

* * * * *